(12) United States Patent
Yang et al.

(10) Patent No.: US 12,492,723 B2
(45) Date of Patent: Dec. 9, 2025

(54) ANTI-THEFT NUT

(71) Applicant: GUANGZHOU ISSYZONE TECHNOLOGY CO., LIMITED, Guangzhou (CN)

(72) Inventors: Taiping Yang, Shenzhen (CN); Guochao Xu, Guangzhou (CN)

(73) Assignee: GUANGZHOU ISSYZONE TECHNOLOGY CO., LIMITED, Guangzhou (CN)

( * ) Notice: Subject to any disclaimer, the term of this patent is extended or adjusted under 35 U.S.C. 154(b) by 123 days.

(21) Appl. No.: 18/628,978

(22) Filed: Apr. 8, 2024

(65) Prior Publication Data

US 2025/0188982 A1 Jun. 12, 2025

(30) Foreign Application Priority Data

Dec. 12, 2023 (CN) .......................... 202311700538.9

(51) Int. Cl.
F16B 41/00 (2006.01)
(52) U.S. Cl.
CPC .................................. F16B 41/005 (2013.01)
(58) Field of Classification Search
CPC ..................................................... F16B 41/005
See application file for complete search history.

(56) References Cited

U.S. PATENT DOCUMENTS

| | | | | |
|---|---|---|---|---|
| 3,952,563 A * | 4/1976 | Yamashita | ........... | E05B 47/0038 70/276 |
| 4,938,108 A * | 7/1990 | Mekler | ........... | B25B 13/485 411/407 |
| 6,308,997 B1 * | 10/2001 | Haseley | ........... | E05B 35/008 292/307 R |
| 8,770,220 B1 * | 7/2014 | Embry | ........... | A62C 35/20 70/180 |
| 9,982,703 B2 * | 5/2018 | Thomas | ........... | F16B 39/103 |
| 2003/0044258 A1 * | 3/2003 | Hove | ........... | F16B 39/282 411/429 |
| 2011/0123293 A1 * | 5/2011 | Matlock | ........... | F16B 37/14 411/429 |
| 2013/0209194 A1 * | 8/2013 | Kratzer | ........... | F16B 41/00 411/204 |
| 2014/0105704 A1 * | 4/2014 | Groppo | ........... | B60B 3/165 411/403 |

(Continued)

FOREIGN PATENT DOCUMENTS

CN 202144824 U 2/2012

Primary Examiner — Mark A Williams
(74) Attorney, Agent, or Firm — Birchwood IP

(57) ABSTRACT

The present disclosure discloses an anti-theft nut, where a channel is provided on one side of a housing, a nut assembly includes a nut body and a locking disc. An upper end face of the locking disc is coaxially provided with a first annular rail, an edge of the upper end face of the locking disc is further provided with a locking groove, a shape of the locking groove matches with a shape of a locking clamp. A lower end of a locking member is provided with a group of mirror symmetrical sliding platforms, which are installed in the first annular rail. An upper end of the locking member is connected to an inner top surface of the housing. The locking clamp is slidably inserted into the locking groove through the channel and one side of the locking clamp is contact with sides of two sliding platforms.

10 Claims, 5 Drawing Sheets

(56) References Cited

U.S. PATENT DOCUMENTS

| | | | |
|---|---|---|---|
| 2014/0178147 A1* | 6/2014 | Lin | F16B 41/005 |
| | | | 411/197 |
| 2014/0348609 A1* | 11/2014 | Chen | F16B 39/282 |
| | | | 411/209 |
| 2016/0264198 A1* | 9/2016 | Laurenzo | F16B 41/005 |
| 2021/0199151 A1* | 7/2021 | Lin | F16B 39/22 |

* cited by examiner

ANTI-THEFT NUT

CROSS-REFERENCE TO RELATED APPLICATIONS

This application claims priority to Chinese Patent Application No. 202311700538.9, filed on Dec. 12, 2023, which is hereby incorporated by reference in its entirety.

TECHNICAL FIELD

The present disclosure relates to the field of anti-theft fasteners technologies, and in particular, to an anti-theft nut.

BACKGROUND

Considering a convenience of loading and unloading, most vehicle-mounted outdoor products (such as a roof rack) will choose to be installed on the vehicle using hand twisted bolts and nuts. However, hand twisted bolts and nuts do not have an anti-theft function, and products exposed outdoors are easily taken away by people directly loosening the nuts. In order to achieve the anti-theft function of fasteners, various forms of anti-theft fasteners have emerged in existing technology, such as an anti-theft bolt disclosed in Chinese utility model patent of CN202144824U, which is composed of a screw, a nut, a nut lock nail, and a key. An outer wall of the screw has a vertical locking groove, a side wall of the nut has a through locking hole. The nut screw is located on the screw, and the locking hole corresponds to the locking groove. An end of the nut lock nail is longitudinally provided with a keyhole, a nut locking pin is provided in the locking hole by a key screw, an inner end of the nut locking pin is located in the locking groove of the screw. By inserting the key into the keyhole of the nut locking pin and rotating it, the nut locking pin can be rotated in or out. A shape of the key corresponds to a shape of the keyhole, and thus, it can be reused, and save costs.

However, the keyhole of the anti-theft bolt mentioned above is exposed, rendering it easy for others to replicate a corresponding key based on the shape of the keyhole in a short period of time, and resulting in very low anti-theft performance.

SUMMARY

In response to the above problems, the present disclosure proposes an anti-theft hand twisted nut structure, aiming to solve the problem of low safety of a keyhole of the existing anti-theft bolt exposed to an outside.

To solve the above-mentioned technical problems, the technical solution of the present disclosure is as follows.

An anti-theft hand twisted nut structure includes a hollow housing, a nut assembly and a locking member that are coaxially installed in the housing, where one side of the housing is provided with a flat channel; the nut assembly includes a nut body that two ends of the nut body expose from a top and a bottom of the housing, and a locking disc coaxially fixed on a circumference of the nut body; an upper end face of the locking disc is coaxially provided with a first annular rail, an edge of the upper end face of the locking disc is further provided with a locking groove that enters a range of the first annular rail; a shape of the locking groove matches with a shape of a locking clamp, a middle of the locking member is provided with a first avoidance hole for avoiding the nut body, a lower end of the locking member is provided with a group of mirror symmetrical sliding platforms, the sliding platforms are installed in the first annular rail and fixed towards the channel; an upper end of the locking member is connected to an inner top surface of the housing, the locking clamp is slidably inserted into the locking groove through the channel, one side of the locking clamp is connected with sides of two sliding platforms.

In some embodiments, opposite sides of two sliding platforms are respectively provided with a longitudinal limit piece, a lower end face of the longitudinal limit piece contacts an upper end face of the locking clamp.

In some embodiments, the housing includes an upper housing and a lower housing that are matched and engaged with each other, centers of the upper housing and the lower housing are respectively provided with a second voidance hole and a third avoidance hole for exposing end faces of the nut body.

In some embodiments, the anti-theft nut further includes a hand-push member and a connection column fixed at a bottom end of the hand-push member, one side of an upper end face of the upper housing away from the channel is provided with an installation hole, a width of the installation hole is greater than a width of the connection column, the connection column enters the housing through the installation hole and is fixedly connected to the locking member, where a top of the upper housing is provided with a linear guide rail parallel to an insertion direction of the locking clamp, two sides of the locking member are slidably installed along the linear guide rai.

In some embodiments, one side of the locking member close to the channel is provided with an elastic member.

In some embodiments, an inner side of the upper housing is provided with a vertical installation column, a surface of the lower housing is provided with fixing holes that are circumferentially distributed, a fixing piece enters a corresponding installation column from the fixing holes.

In some embodiments, an upper of the nut body is located within the second avoidance hole, a lower part of the nut body extends from the third avoidance hole, a lower part of the nut body is clearance-fit with the third avoidance hole.

In some embodiments, an upper end face of the lower housing is coaxially provided with a second annular rail, a lower end face of the locking disc is provided with a convex ring for entering the second annular rail.

In some embodiments, several locking grooves are distributed circumferentially at an edge of the upper end face of the locking disc, and there is no overlapping interference between adjacent locking grooves.

In some embodiments, the sliding platform is provided with one group.

The beneficial effect of the present disclosure is that by providing with a rotatable or locking nut body inside a hollow housing, and then providing with a flat channel on one side of the housing as an insertion port for a locking clamp, the locking groove in the housing is not easy to observe due to the flat shape of the channel, and rotation can be carried out between the channel and the locking groove. Therefore, a user can also rotate the locking groove to an unobservable position, greatly improving a safety of the anti-theft nut.

Figure 1:
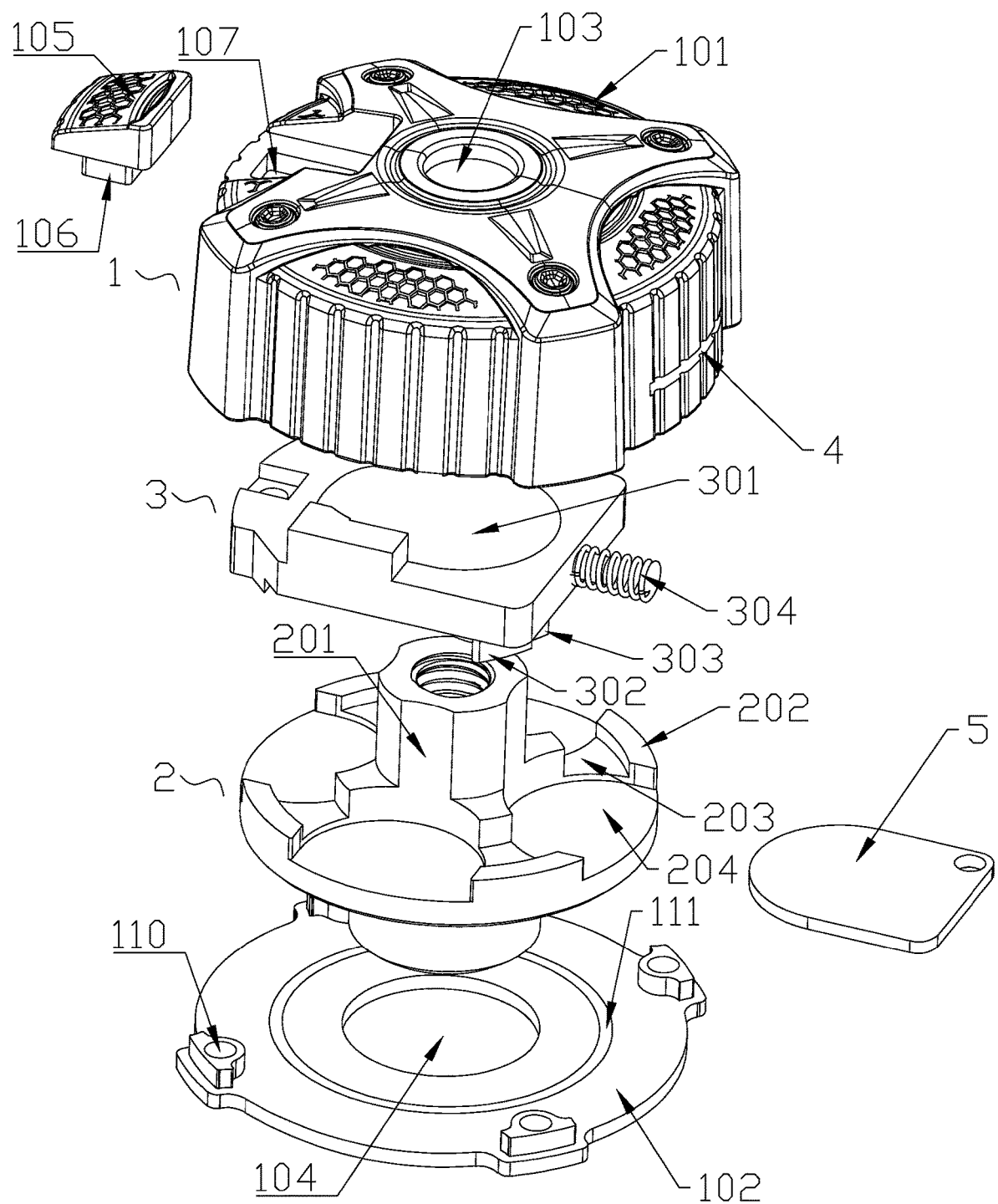
FIG. 1 is a first exploded view of an anti-theft nut disclosed in an embodiment of the present disclosure.

Numeral reference: 1—Housing, 2—Nut assembly, 3—Locking member, 4—Channel, 5—Locking clamp, 101—Upper housing, 102—Lower housing, 103—Second avoidance hole, 104—Third avoidance hole, 105—Hand-push member, 106—Connection column, 107—Installation hole, 108—Linear guide rail, 109—Installation column, 110—Fixed hole, 111—Second annular rail, 201—Nut body, 202—Locking disc, 203—First annular rail, 204—Locking groove, 205—Convex ring, 301—First avoidance hole, 302—Sliding platform, 303—Longitudinal limit piece, 304—Elastic member.

DESCRIPTION OF EMBODIMENTS

In order to make the purpose, technical solution, and advantages of the present disclosure clearer and definite, the following will provide further detailed explanations of the content of the present disclosure in combination with drawings and specific embodiments. It can be understood that the specific embodiments described here are only intended to explain the present disclosure and not to limit it. Furthermore, it should be noted that for ease of description, only relevant parts of the present disclosure are shown in the drawings, rather than the entire content.

This embodiment proposes an anti-theft hand twisted nut structure, as shown in FIG. 1, which includes a hollow housing 1, a nut assembly 2 and a locking member 3 that are coaxially installed in the housing 1. One side of the housing 1 is provided with a flat channel 4, the nut assembly 2 includes a nut body 201 that two ends expose from a top and a bottom of the housing 1, and a locking disc 202 coaxially fixed on a circumference of the nut body 201. An upper end face of the locking disc 202 is coaxially provided with a first annular rail 203, an edge of the upper end face of the locking disc 202 is further provided with a locking groove 204 that enters a range of the first annular rail 203. A shape of the locking groove 204 matches with a shape of a locking clamp 5. A middle of the locking member 3 is provided with a first avoidance hole 301 for avoiding the nut body 201, a lower end of the locking member 3 is provided with a group of mirror symmetrical sliding platforms 302, the sliding platforms 302 are matched and installed in the first annular rail 203 and fixed towards the channel 4. An upper end of the locking member 3 is connected to an inner top surface of the housing 1. The locking clamp 5 is slidably inserted into the locking groove 204 through the channel 4, one side of the locking clamp 5 is in contact with sides of two sliding platforms 302.

In this embodiment, by providing with a rotatable or locking nut body 201 in the hollow housing 1, and then providing with a flat channel 4 on the side of the housing 1 as an insertion port of the locking clamp 5, since the channel 4 is flat, it is not easy to observe the locking groove 204 in the housing 1, and the channel 4 can rotate with the locking groove 204, so that a user can also rotate the locking groove 204 to an unobservable position, thereby greatly improves a safety of the anti-theft nut.

The following is an explanation of a locked state and a slipping state of the anti-theft nut.

Figure 3:
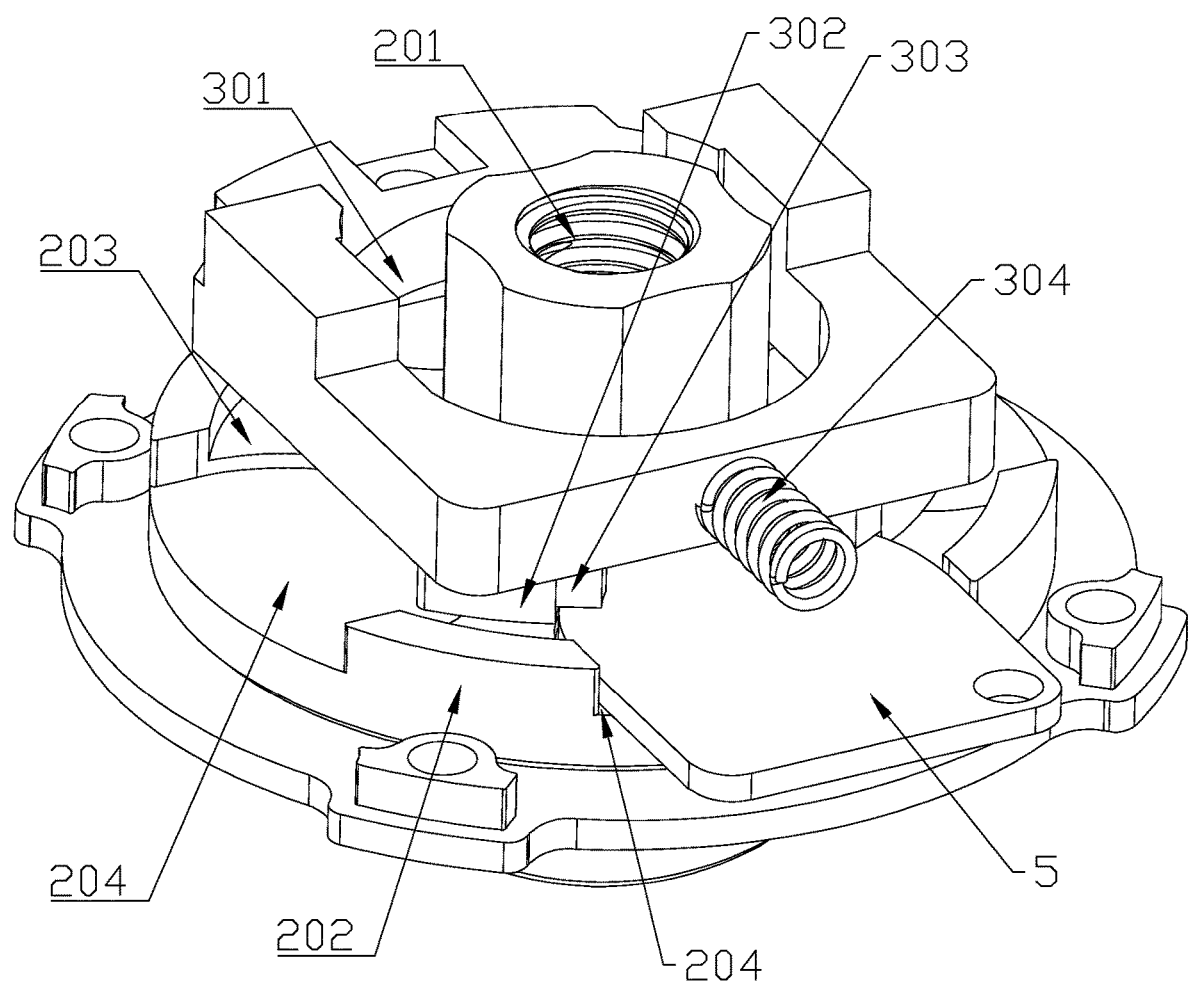
FIG. 3 is a schematic diagram of the anti-theft nut in a locked state and hidden behind a housing disclosed in an embodiment of the present disclosure.
Figure 4:
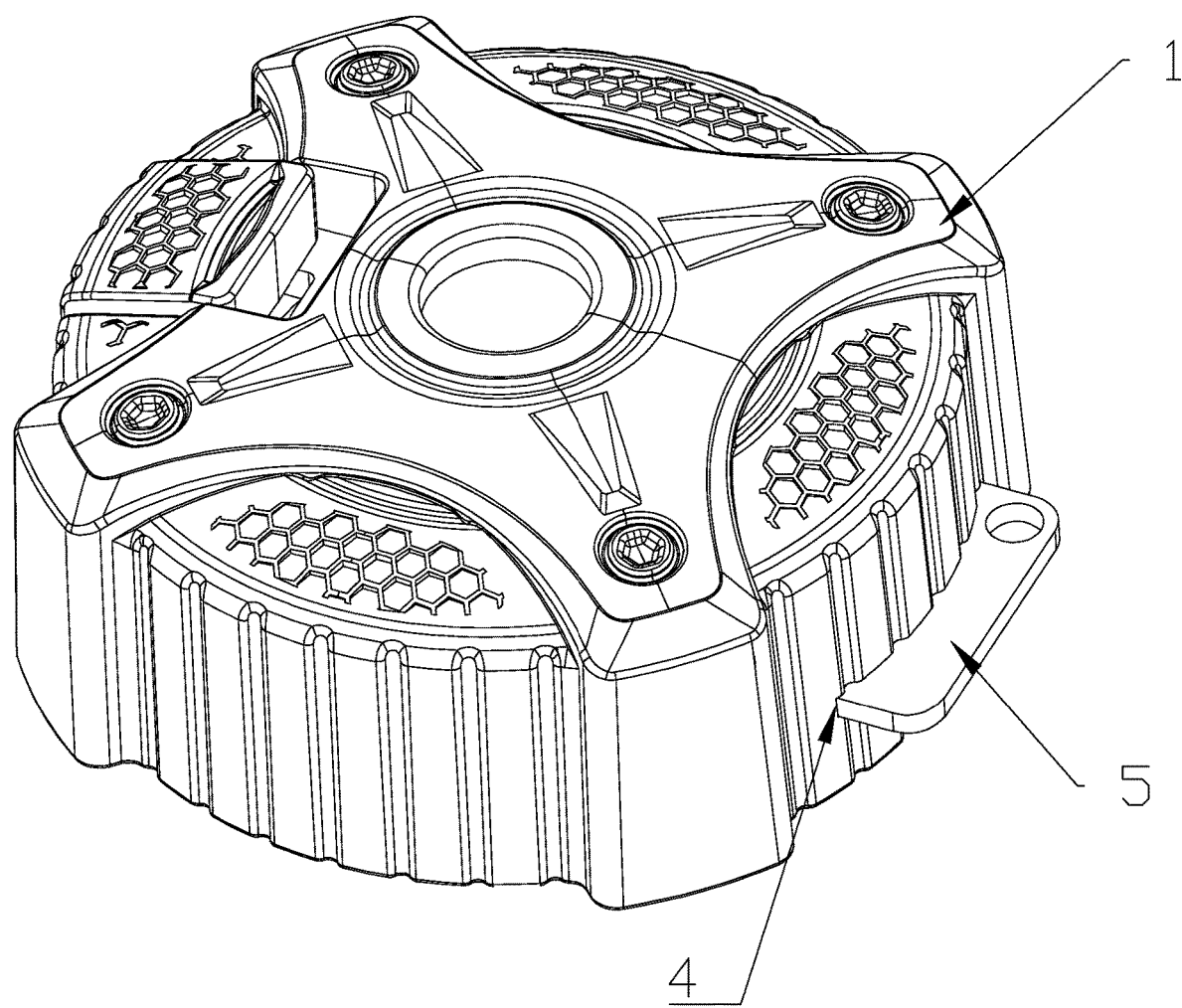
FIG. 4 is a schematic diagram of the anti-theft nut in the locked state disclosed in an embodiment of the present disclosure.

Locked state: used for a normal screw connection task (including installation and disassembly), first, the user needs to twist the housing 1 to align the channel 4 with the locking groove 204 (sliding platform 302 and the channel 4 are fixed, the sliding platform 302 always align with the channel 4), then the locking clamp 5 is slidably inserted into the locking groove 204 from the channel 4. A fitting relationship between the locking clamp 5 and channel 4 in the locked state is shown in FIGS. 3 and 34. At this point, head of the locking clamp 5 abuts against one side of the locking groove 204, and two sides of the locking clamp 5 abut against sides of two sliding platforms 302, and thus, forming the locked state. Therefore, when the user continues to twist the housing 1, a torque subjected by the housing 1 will first be transmitted to the locking member 3 that is connected to. As the sliding platform 302 at the lower end of the locking member 3 contacts the locking clamp 5, the torque is further transmitted to the locking clamp 5, the torque subjected by the locking clamp 5 is transmitted to the entire locking disc 202 through the locking groove 204, and finally the torque subjected by the locking disc 202 will first be transmitted to the nut body 201 that has a connection relationship with it. That is to say, the locking clamp 5 acts as a middleware for transmitting torque in this scheme. When the user inserts the locking clamp 5 into the locking groove 204, from an external appearance, the nut body 201 and the housing 1 are temporarily fixed as a whole by the locking clamp 5. The user can control the nut body 201 to rotate by turning the housing 1 at the same time. At this time, the anti-theft hand twisted nut structure of this scheme is no different from a normal nut, which can smoothly connect with an ordinary bolt, can also remove the anti-theft nut from the bolt. In fact, the torque subjected by the housing 1 needs to pass through the locking member 3, the sliding platform 302, the locking clamp 5, the locking groove 204, and the locking disc 202 in sequence before it can finally be transmitted to the nut body 201.

Figure 5:
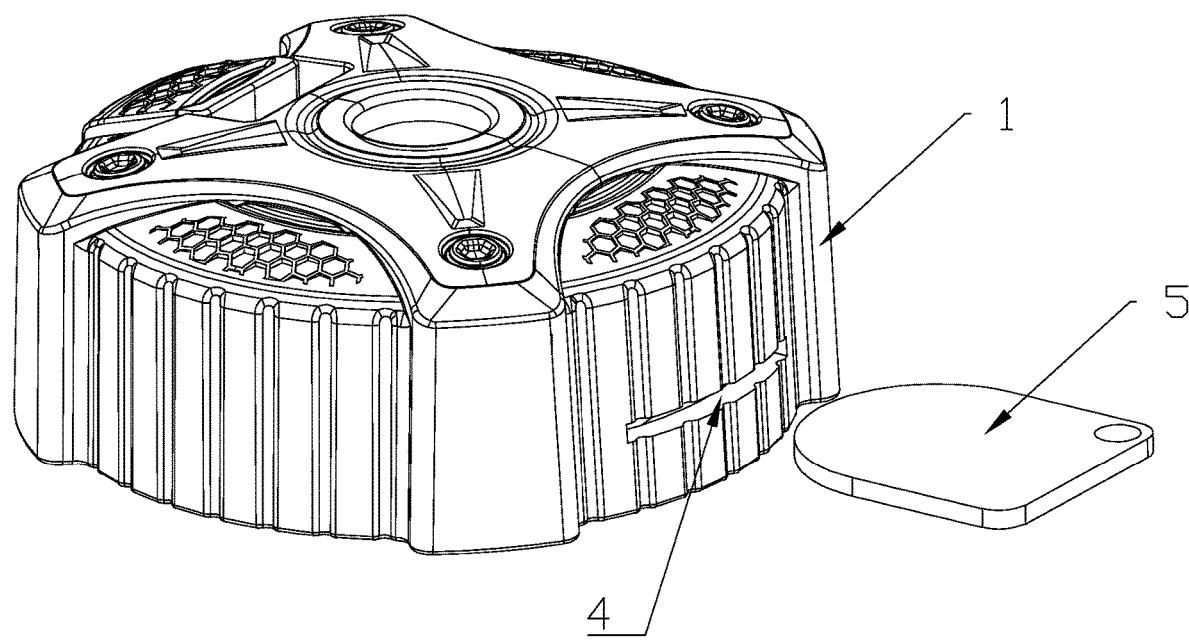
FIG. 5 is a schematic diagram of the anti-theft nut in a slipping state disclosed in an embodiment of the present disclosure.

Slipping state: used for an anti-theft task after a screw connection. When the locking clamp 5 is pulled out from the locking groove 204, a connection relationship between the locking clamp 5 and the channel 4 in the slipping state is shown in FIG. 5. The connection relationship between the locking disc 202 and the locking member 3 is immediately disappear. When the user turns the housing 1, the torque subjected by the housing 1 can be transmitted to the locking member 3. However, due to a disappear of a limit position of the locking clamp 5 by the sliding platform 302 at the lower end of the locking member 3. Therefore, the sliding platform 302 can only rotate infinitely along the first annular rail 203. From the external appearance, the nut body 201 and the housing 1 exhibit rotational slippage. The user cannot control the nut body 201 to rotate at the same time by turning the housing 1, so that the anti-theft nut cannot be removed from the bolt. It should be noted that due to the rotational slippage between the nut body 201 and the housing 1, before entering the locked state, the user needs to twist the housing 1 (at this time, the nut body 201 has been fixed on a certain bolt, and the locking groove 204 and the locking disc 202 should be considered as a fixed mechanism). With the help of the sliding rotation relationship between the sliding platform 302 and the first annular rail 203, the user needs to align the channel 4 with the locking groove 204 so as to prepare to slidably insert the sliding clamp 5 from the channel 4 into the locking groove 204 for locking.

In the above scheme, the sliding platform 302 and the locking groove 204 only limit one side of the locking clamp 5. Specifically, a thickness of the locking clamp 5 is slightly greater than a depth of the locking groove 204. A purpose is that when the locking clamp 5 is inserted into the locking groove 204, a lower half of the locking clamp 5 completely occupies a space of the locking groove 204. Therefore, the locking groove 204 generates a stable lateral limit for the locking clamp 5, a protruded upper half of the locking clamp 5 can enters the range of the first annular rail 203, causing the upper half of the locking clamp 5 to come into contact with the sliding platform 302. Therefore, the sliding platform 302 also generates a stable lateral limit on the locking clamp 5. To further fix the locking clamp 5 and prevent it from falling during a rotation process of the housing 1, continue to refer to FIG. 1, opposite sides of two sliding platforms 302 are respectively provided with a longitudinal limit piece 303. A lower end face of the longitudinal limit piece 303 contacts the upper end face of the locking clamp 5, thereby providing a longitudinal limit for the locking clamp 5.

Figure 2:
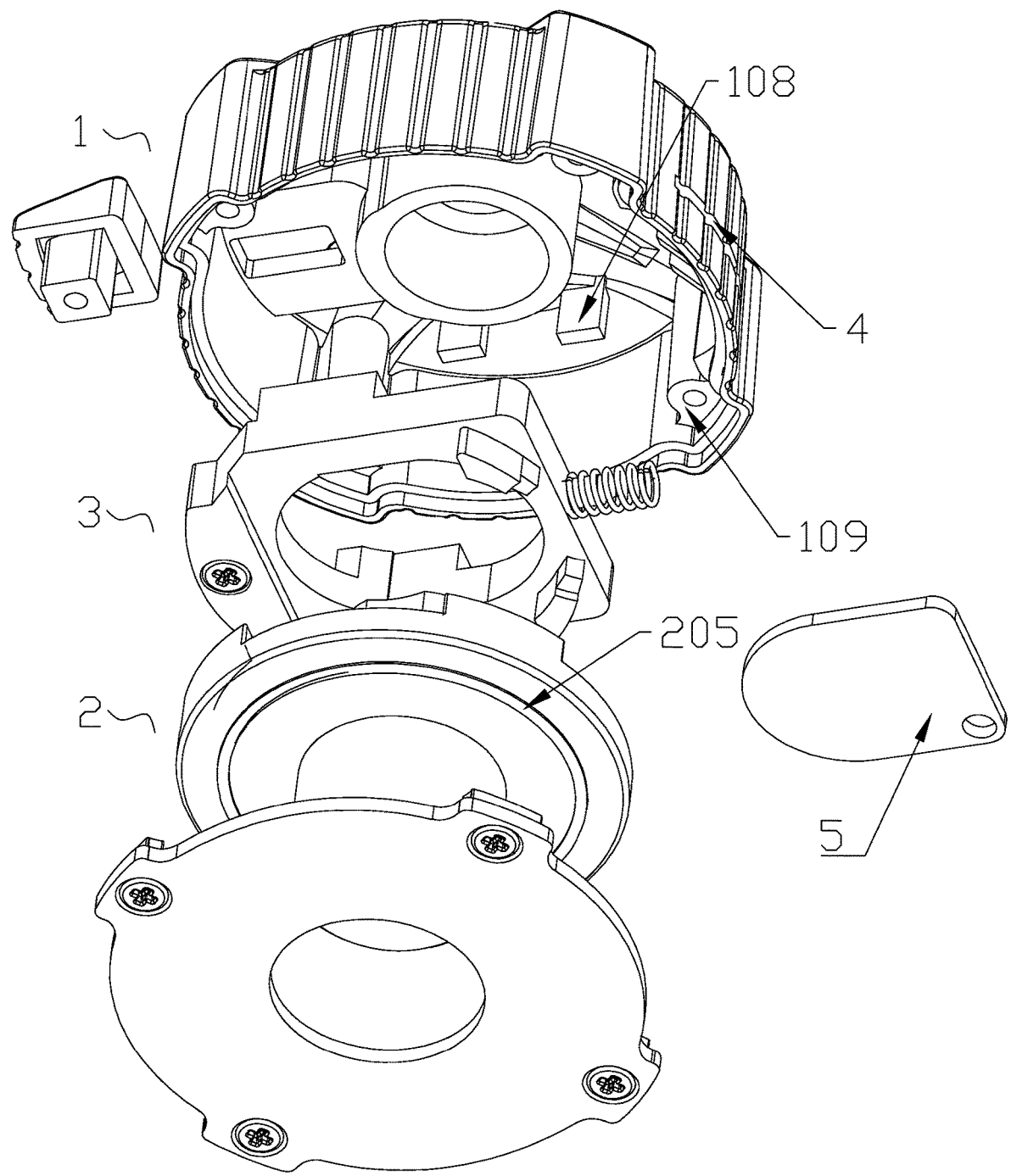
FIG. 2 is a second exploded view of the anti-theft nut disclosed in an embodiment of the present disclosure.

In this embodiment, due to a need to install multiple components in the housing 1, and considering a production efficiency, the housing 1 should adopt a detachable design. In an example, continuing to refer to FIG. 1, the housing 1 includes an upper housing 101 and a lower housing 102 that are matched and interlocked with each other. Centers of the upper housing 101 and the lower housing 102 are respectively provided with a second avoidance hole 103 and a third avoidance hole 104 for exposing end faces of the nut body 201. Obviously, through an interlocking design of the upper housing 101 and the lower housing 102, multiple components can be produced and assembled first, and then installed in the upper housing 101 and the lower housing 102, the second avoidance hole 103 and the third avoidance hole 104 can be aligned with two end faces of the nut body 201. The anti-theft hand twisted nut in the locked state is no different from a regular nut, both of which are designed to run through the top and bottom. From FIG. 2, it can be seen that the upper housing 101 is in a covered shape and the lower housing 102 is a corresponding circular shape. Alternatively, the upper housing 101 and the lower housing 102 can be set to a symmetrical shape to achieve the interlocking function.

In this embodiment, a shape of the locking clamp 5 can be exactly the same as the shape of the locking groove 204. When the locking clamp 5 is inserted into the locking groove 204, the locking clamp 5 is completely submerged in the housing 1, and the user cannot manually pull out the locking clamp 5 to release the locked state. In addition, a tail of the locking clamp 5 can be extended. When the locking clamp 5 is inserted into the locking groove 204, the tail of the locking clamp 5 is still outside the housing 1, then the user can manually pull out the locking clamp 5 to release the locked state. However, although the latter can be quickly withdrawn by extending the tail of the locking clamp 5, a total length of the locking clamp 5 should not be too long, otherwise it will affect a portability of the locking clamp 5 (equivalent to a key). More importantly, the locking clamp 5 is exposed outside the housing 1 and is prone to interference with other nuts or the product itself, especially when two nuts are installed at a very close position. This embodiment provides one optional solution for the quick retrieval of locking clamp 5, as illustrated by the following example. Specifically, refer to FIGS. 1 and 2, which further include a hand-push member 105 and a connection column 106 fixed at a bottom of the hand-push member 105. An installation hole 107 is provide on one side of an upper end face of the upper housing 101 away from the channel 4. A width of the installation hole 107 is greater than a width of the connection column 106. The connection column 106 enters the housing 1 through the installation hole 107 and is fixedly connected to the locking member 3. Where, a linear guide rail 108 parallel to an insertion direction of the locking clamp 5 is provided at a top of the upper housing 101, two sides of the locking member 3 are slidably installed along the linear guide rail 108. In this implementation scheme, due to the width of the installation hole 107 being greater than the width of the connection column 106, the installation hole 107 can allow the connection column 106 to slide to a certain extent. The user indirectly pushes the connection column 106, the locking member 3, and the locking disc 202 towards the direction of channel 4 by pushing the hand-push member 105 towards the channel 4, thereby indirectly pushing the connection column 106, the locking member 3, and the locking disc 202 towards the channel 4 for a certain distance, and a final manifestation is that the locking clamp 5 is pushed out form the channel 4 for a short distance, and the user can pull out the locking clamp 5 by a hand, thereby releasing the locked state.

It should also be noted that in the above scheme, in order to achieve the linear limit of the locking member 3, a scheme of "sliding installation of two sides of the locking member 3 along the linear guide rail 108" is adopted. When the locking clamp 5 is pushed out from the channel 4, the second avoidance hole 103 and the third avoidance hole 104 are no longer aligned with two end faces of the nut body 201, which means that the nut body 201 cannot be screwed to the bolt normally. At this time, a manual reset is required, that is, the hand-push member 105 is pulled away from the channel 4. In response to the shortcomings of the above solution, in a preferable solution, an elastic member 304 is provided on one side of the locking member 3 close to the channel 4. Continuing to refer to FIG. 1, two ends of the elastic member 304 are respectively abuts against one side of the locking member 3 close to the channel 4, as well as an inner wall of the upper housing 101. When the user pushes the hand-push member 105 towards the channel 4, the elastic member 304 immediately begins to store energy, and when the user releases the hand, the elastic member 304 releases an elastic potential energy, the locking member 3, the hand-push member 105, the connection column 106, and the locking disc 202 are pushed away from the channel 4 as a whole until the side of the locking member 3 abuts against the inner wall of the housing 101 before stopping. A final result is that the second avoidance hole 103 and third avoidance hole 104 automatically align with the two end faces of the nut body 201. Optionally, a fixed column can be provided on one side of locking member 3 close to the channel 4, and then a reset pressure spring can be provided on the fixed column.

Furthermore, in the above scheme, the upper housing 101 and lower housing 102 are matched interlocking design. To improve the anti-theft performance, please refer to FIGS. 1 and 2. An inner side of the upper housing 101 is provided with a vertical installation column 109, one surface of the lower housing 102 is provided with fixed holes 110 that are circumferentially distributed. A fixing member enters a corresponding installation column 109 through the fixed holes 110. The above-mentioned fixing member can use an ordinary screw and can achieve a fastening function without limitation. Through this scheme, when the bolt with the anti-theft nut structure is properly threaded (with the lower housing 102 facing the product), a gap between the lower housing 102 and the product (such as a steel frame of a luggage rack) is not enough for a thief to use a normal one-way loosening method to loosen the fixing member. Unless the thief can obtain a card and enter the locked state, otherwise, the fixing member cannot be disassembled, that is, it is unable to disassemble the upper housing 101 and the lower housing 102.

Considering the need for smooth rotation between the nut body 201 and the housing 1 in anti-theft state, in order to avoid the housing 1 driving the nut body 201 to rotate, in one example, continuing to refer to FIG. 1, an upper of the nut body 201 is located within the second avoidance hole 103, a lower of the nut body 201 extends from the third avoidance hole 104, and the lower part of the nut body 201 is clearance-fit with the third avoidance hole 104, by increasing the gap between the lower of the nut body 201 and the third avoidance hole 104.

In this embodiment, it is necessary to ensure that the locking disc 202 rotates along an axis of the housing 1. In one example, referring to FIGS. 1 and 2, the upper end face of the lower housing 102 is coaxially provided with a second annular rail 111, and the lower end face of the locking disc 202 is provided with a convex ring 205 for entering the second annular rail 111. A coaxial limit is achieved through a cooperation between the second annular rail 111 and the convex ring 205.

In a preferred solution, continuing to refer to FIG. 1, several locking grooves 204 are distributed circumferentially at an edge of the upper end face of the locking disc 202, and there is no overlapping interference between adjacent locking grooves 204. This solution allows the user to quickly align any locking groove 204 with the channel 4 by providing with multiple locking grooves 204. As can be seen from FIG. 1, four locking grooves 204 are distributed circumferentially at the edge of the upper end face of the locking disc 202, due to all four locking grooves 204 entering into the range of the first annular rail 203, it can be seen from the drawing that the first annular rail 203 is not a complete circular channel. In fact, the locking groove 204 has not damaged the function of the first annular rail 203, and the first annular rail 203 can still allow the sliding platform 302 to rotate freely inside the sliding platform.

Considering that the locking member 3 cannot rotate relative to the housing 1, and the sliding platform 302 is always aligned with the channel 4, in this embodiment, the sliding platform 302 is provided with one group.

The above embodiments are only intended to illustrate the technical concept and characteristics of the present disclosure, and their purpose is to enable ordinary technical personnel in the art to understand the content of the present disclosure and implement it accordingly, without limiting the protection scope of the present disclosure. Any equivalent changes or modifications made based on the essence of the present disclosure shall be covered within the protection scope of the present disclosure.

What is claimed is:

1. An anti-theft nut, comprising a hollow housing, a nut assembly and a locking member that are coaxially installed in the housing; wherein one side of the housing is provided with a flat channel; the nut assembly comprises a nut body that two ends of the nut body expose from a top and a bottom of the housing, and a locking disc coaxially fixed on a circumference of the nut body, an upper end face of the locking disc is coaxially provided with a first annular rail, an edge of the upper end face of the locking disc is further provided with a locking groove that enters a range of the first annular rail;

a shape of the locking groove matches with a shape of a locking clamp, a middle of the locking member is provided with a first avoidance hole for avoiding the nut body, a lower end of the locking member is provided with a group of mirror symmetrical sliding platforms, the sliding platforms are installed in the first annular rail and fixed towards the channel;

an upper end of the locking member is connected to an inner top surface of the housing, the locking clamp is slidably inserted into the locking groove through the channel, one side of the locking clamp is connected with sides of two sliding platforms.

2. The anti-theft nut as claimed in claim 1, wherein opposite sides of two sliding platforms are respectively provided with a longitudinal limit piece, a lower end face of the longitudinal limit piece contacts an upper end face of the locking clamp.

3. The anti-theft nut as claimed in claim 1, wherein the housing comprises an upper housing and a lower housing that are matched and engaged with each other, centers of the upper housing and the lower housing are respectively provided with a second voidance hole and a third avoidance hole for exposing end faces of the nut body.

4. The anti-theft nut as claimed in claim 3, further comprising a hand-push member and a connection column fixed at a bottom end of the hand-push member, one side of an upper end face of the upper housing away from the channel is provided with an installation hole, a width of the installation hole is greater than a width of the connection column, the connection column enters the housing through the installation hole and is fixedly connected to the locking member, wherein a top of the upper housing is provided with a linear guide rail parallel to an insertion direction of the locking clamp, two sides of the locking member are slidably installed along the linear guide rail.

5. The anti-theft nut as claimed in claim 4, wherein one side of the locking member close to the channel is provided with an elastic member.

6. The anti-theft nut as claimed in claim 3, wherein an inner side of the upper housing is provided with a vertical installation column, a surface of the lower housing is provided with fixing holes that are circumferentially distributed, a fixing piece enters a corresponding installation column from the fixing holes.

7. The anti-theft nut as claimed in claim 3, wherein an upper of the nut body is located within the second avoidance hole, a lower part of the nut body extends from the third avoidance hole, a lower part of the nut body is clearance-fit with the third avoidance hole.

8. The anti-theft nut as claimed in claim 7, wherein an upper end face of the lower housing is coaxially provided with a second annular rail, a lower end face of the locking disc is provided with a convex ring for entering the second annular rail.

9. The anti-theft nut as claimed in claim 1, wherein several locking grooves are distributed circumferentially at an edge of the upper end face of the locking disc, and there is no overlapping interference between adjacent locking grooves.

10. The anti-theft nut as claimed in claim 1, wherein the sliding platform is provided with one group.

* * * * *